United States Patent [19]
Nakayama et al.

[11] Patent Number: 5,678,858
[45] Date of Patent: Oct. 21, 1997

[54] AIR BAG WITH TEARABLE AND NON-TEARABLE TETHERS

[75] Inventors: Yoshikazu Nakayama; Junichi Yoshida; Tsuneo Chikaraishi, all of Shiga, Japan

[73] Assignee: Takata Corporation, Tokyo, Japan

[21] Appl. No.: 585,870

[22] Filed: Jan. 16, 1996

[30] Foreign Application Priority Data

Jan. 23, 1995 [JP] Japan .................. 7-008112

[51] Int. Cl.⁶ .................................................. B60R 21/16
[52] U.S. Cl. ............................. 280/743.2; 280/728.2
[58] Field of Search ............................. 280/743.2, 743.1, 280/731, 728.1, 728.2, 729, 730.1, 732

[56] References Cited

U.S. PATENT DOCUMENTS

| | | | |
|---|---|---|---|
| 4,830,401 | 5/1989 | Honda | 280/743.1 |
| 5,180,188 | 1/1993 | Frantz et al. | 280/743.1 |
| 5,249,825 | 10/1993 | Gordon et al. | 280/728.1 |
| 5,362,101 | 11/1994 | Sugiura et al. | 280/743.2 |

FOREIGN PATENT DOCUMENTS

| | | | |
|---|---|---|---|
| 1-122750 | 5/1989 | Japan | 280/743.2 |
| 2-37059 | 2/1990 | Japan | 280/743.2 |
| 3-248944 | 11/1991 | Japan | 280/728.1 |
| 6-234344 | 8/1994 | Japan . | |

*Primary Examiner*—Brian L. Johnson
*Assistant Examiner*—Peter C. English
*Attorney, Agent, or Firm*—Kanesaka & Takeuchi

[57] ABSTRACT

An air bag includes a main body formed by sewing up the respective peripheries of two fabrics, a front panel and a rear panel with a thread, first tether belts and second tether belts for connecting the central portion of the front panel and the central portion of the rear panel. Each of the first tether belts has a low strength portion structured by forming notches on both sides. Stud bolts are inserted into through holes of the first tether belts, through holes of the air bag, bolt holes of the retainer, and bolt holes of a flange. The air bag deploys to the outside of the steering wheel quite rapidly in the initial stage of the deployment, and the front panel extends suitably forward in the latter stage of the deployment.

4 Claims, 6 Drawing Sheets

5,678,858

AIR BAG WITH TEARABLE AND NON-TEARABLE TETHERS

FIELD OF THE INVENTION

The present invention relates to an air bag which protects a vehicle occupant by deploying when the vehicle comes into collision. More particularly, the present invention relates to an air bag for an occupant in a driver's seat, which is improved to rapidly deploy to the outside of a steering wheel.

DESCRIPTION OF THE RELATED ART

An air bag device for an occupant in a driver's seat (hereinafter, referred to as the "driver air bag device") installed into a steering wheel inflates or extends an air bag rapidly by pressure of gas discharged from an inflator to protect the occupant in an emergency such as the vehicle collision.

In the driver air bag device as mentioned above, it is preferable that the air bag deploys in the side directions (up, down, left, and right directions which are perpendicular to the direction toward the occupant) rapidly when the inflator activates.

FIG. 7 is a perspective view showing a driver air bag in its fully deployed state, a main body 14 which is formed by sewing up the respective peripheries of two circular fabrics, a front panel 10 and a rear panel 12. The rear panel 12 has an opening 16 in the center thereof to receive an end portion of the inflator. The opening 16 is surrounded by small holes 18 through which mounting members such as bolts, pins, or rivets are inserted to attach the main body 14 to the retainer. The rear panel 12 has a vent hole 20 for letting gas escape from the main body 14 when the occupant plunges into the air bag.

In order to prevent the air bag from protruding toward the occupant when deploying, the front panel 10 and the rear panel 12 may be connected to each other by tether belts.

It should be noted that the air bag device is formed by attaching the main body 14 and the inflator to a retainer, and covering the main body 14 with a module cover. When the air bag deploys by the gas from an inflator, the module cover tears to open. The tether belts are tightly stretched when the air bag deploys, thereby preventing the front panel 10 from further extending forward.

Normally, first ends of the tether belts are sewn to a portion near the center of the front panel 10, and the other ends are sewn to a portion near the edge of the opening 16 of the rear panel 12. The length of each tether belt 22 (the distance between the connected portions of the panels 10 and 12) is approximately 200–400 mm.

As mentioned above, the air bag is desired to deploy as rapidly as possible in the side directions. For that, an air bag characterized in that, as shown in FIG. 8 and FIG. 9, first ends of the tether belts 22 are sewn on the front panel 24 and the other ends of the tether belts 22 are clamped between the retainer 26 and a flange 28a of the inflator 28, is disclosed in U.S. Pat. No. 5,249,825. At the initial state of the deployment of the air bag, the central portion of the front panel 24 is caught to be positioned near the inflator so that the air bag develops in the side directions as shown in FIG. 8. At the latter stage of the deployment, the tether belts 22 come off between the retainer 26 and the flange 28a so that the front panel 24 extends forward as shown in FIG. 9.

In the air bag disclosed in U.S. Pat. No. 5,249,825, there is quite a possibility that the clamping force (frictional force) between the retainer 26 and the inflator flange 28a for clamping the tether belts 22 may differ from product to product so that the products can not have the same deployment characteristics. Further, the length of the tether belts 22 in the initial stage may not be accurately set to be constant. That is, the clamped positions of the tether belts 22 may not be the same, with the result that the length of the tether belts 22 may differ from product to product.

Furthermore, in the air bag of U.S. Pat. No. 5,249,825, since the front panel 24 is released from being caught by the tether belts 22 in the latter stage of the deployment, the front panel 24 of the air bag protrudes significantly forward.

It should be noted that Japanese Unexamined Patent Publication No. H6(1994)-234344 discloses an air bag in which the center portions of the front and the rear panels are sewn together with a weak thread. In the latter stage of the development, the front panel protrudes forward by breaking the thread. However, the air bag has a disadvantage in that the front panel protrudes excessively forward after breaking the thread.

OBJECT AND SUMMARY OF THE INVENTION

The first object of the present invention is to provide an air bag which can deploy to the outside of the steering wheel quickly in the side directions thereof in the initial stage of the deployment.

The second object of the present invention is to provide an air bag the front panel of which is positioned at a suitable distance from the inflator even in the latter stage of the deployment.

The third object of the present invention is to provide an air bag which is economized in the steps of sewing tether belts to the panels and can be easily manufactured, furthermore the production cost of which is low.

An air bag according to the present invention is of a type in which the respective central portions of a front panel and a rear panel are caught to be close to each other by tether belts, and is characterized by first tether belts for connecting the front panel to the inflator only in the initial stage of the deployment and second tether belts for stopping the front panel at a predetermined distance from the inflator.

An air bag mounting structure according to the present invention is characterized in that first ends of the first tether belts are connected to the front panel by sewing or the like, and holes formed in the other ends of the first tether belts are fixed to mounting members.

An air bag of the first aspect comprises: a main body formed by connecting the respective peripheries of a front panel and a rear panel, an inflator receiving opening formed in the rear panel, through holes formed about the periphery of the inflator receiving opening of the main body, through which mounting members for mounting the main body to a retainer of an air bag device are inserted, at least one first tether belt, an end of which is connected to the front panel, and the other end of which is connected to neither the front panel nor the rear panel, the other end having at least one through hole through which the mounting members are inserted, the length $L_1$ from the through hole to the connected portion to the front panel being 150 mm or less, a low strength portion formed in the first tether belt for allowing the first tether belt to be torn after at least a part of the main body deploys to the outside of the steering wheel, and at least one second tether belt, an end of which is connected to the front panel, and the other end of which is connected to the rear panel, the length $L_2$ between the connected portions of the front and rear panels being 50 mm or more larger than the length $L_1$, the second tether belt having a strength not to be torn and to connect the front panel and rear panel even after the main body is fully deployed.

In an air bag of the second aspect, based on the first aspect, the front panel, the rear panel, and the tether belts are made of fabrics, the respective peripheries of the front panel and the rear panel are connected to each other by sewing, the end of the first tether belt is connected to the front panel by sewing, and the ends of the second tether belt are connected to the front and rear panels, respectively, by sewing.

In an air bag of the third aspect, based on the first aspect or the second aspect, the length $L_1$ of the first tether belt is 100 mm or less, and the length $L_2$ of the second tether belt is 50 mm or more longer than the length $L_1$.

In an air bag of the fourth aspect, based on the first aspect or the second aspect, the other end of the first tether belt has a plurality of the through holes spaced apart from each other in the longitudinal direction of the first tether belt, and the length $L_1$ is the length between the through hole nearest to the connected portion to the front panel and the connected portion.

An air bag mounting structure of the fifth aspect for mounting an air bag, has an inflator receiving opening and mounting member receiving holes disposed about a periphery of the inflator receiving opening, and is characterized in that the retainer is provided with an inflator mounting opening and mounting member receiving holes disposed about a periphery of the inflator mounting opening, a peripheral portion of the inflator receiving opening of the air bag is clamped by the peripheral portion of the inflator mounting opening of the retainer and a ring disposed inside the air bag, and mounting members protruding from the ring are inserted into the respective through holes of the air bag and the retainer, wherein the air bag is based on any one of the first through the fourth aspects, and the mounting members are inserted into the through hole or holes of the first tether belt.

In an air bag mounting structure of the sixth aspect, based on the fifth aspect, the mounting members are bolts, the inflator has a flange to be laid on the peripheral portion of the inflator mounting hole of the retainer so that the peripheral portion thereof is positioned between the air bag and the flange, the bolts are inserted into bolt through holes formed in the flange and receive nuts, and the other end of the first tether belt is disposed between the peripheral portion of the inflator receiving opening of the air bag and the ring or the retainer.

In the air bag according to the present invention, the central portion of the front panel is close to the central portion of the rear panel so that the distance therebetween is 150 mm or less, preferably 100 mm or less in the initial stage of the deployment, thereby applying gas from the inflator mainly to make the peripheral portion of the air bag extend to the outside of the steering wheel.

After the peripheral portion of the air bag extends enough to the outside of the steering wheel, gas from the inflator pushes forward the central portion of the front panel away from the central portion of the rear panel so that the first tether belts are torn. Accordingly, the front panel extends forward until the second tether belts are tightly stretched.

The first ends of the first tether belts are connected to the front panel by sewing or the like. Since the length (150 mm or less) of the first tether belts is quite short as compared with the conventional one, it is quite difficult to sew the other ends of the first tether belts on the periphery of the inflator receiving opening of the rear panel. For that, according to the present invention, the other ends of the tether belts are each provided with holes and the mounting members such as bolts are inserted into the holes to engage the other ends of the first tether belts with the mounting member.

The above structure eliminates a step of connecting the other ends of the tether belts to the rear panel by sewing or the like, thereby significantly facilitating the manufacture of the air bag.

DESCRIPTION OF THE PREFERRED EMBODIMENTS

Hereinafter, an embodiment of the present invention will be described with reference to the attached drawings.

Figure 1:
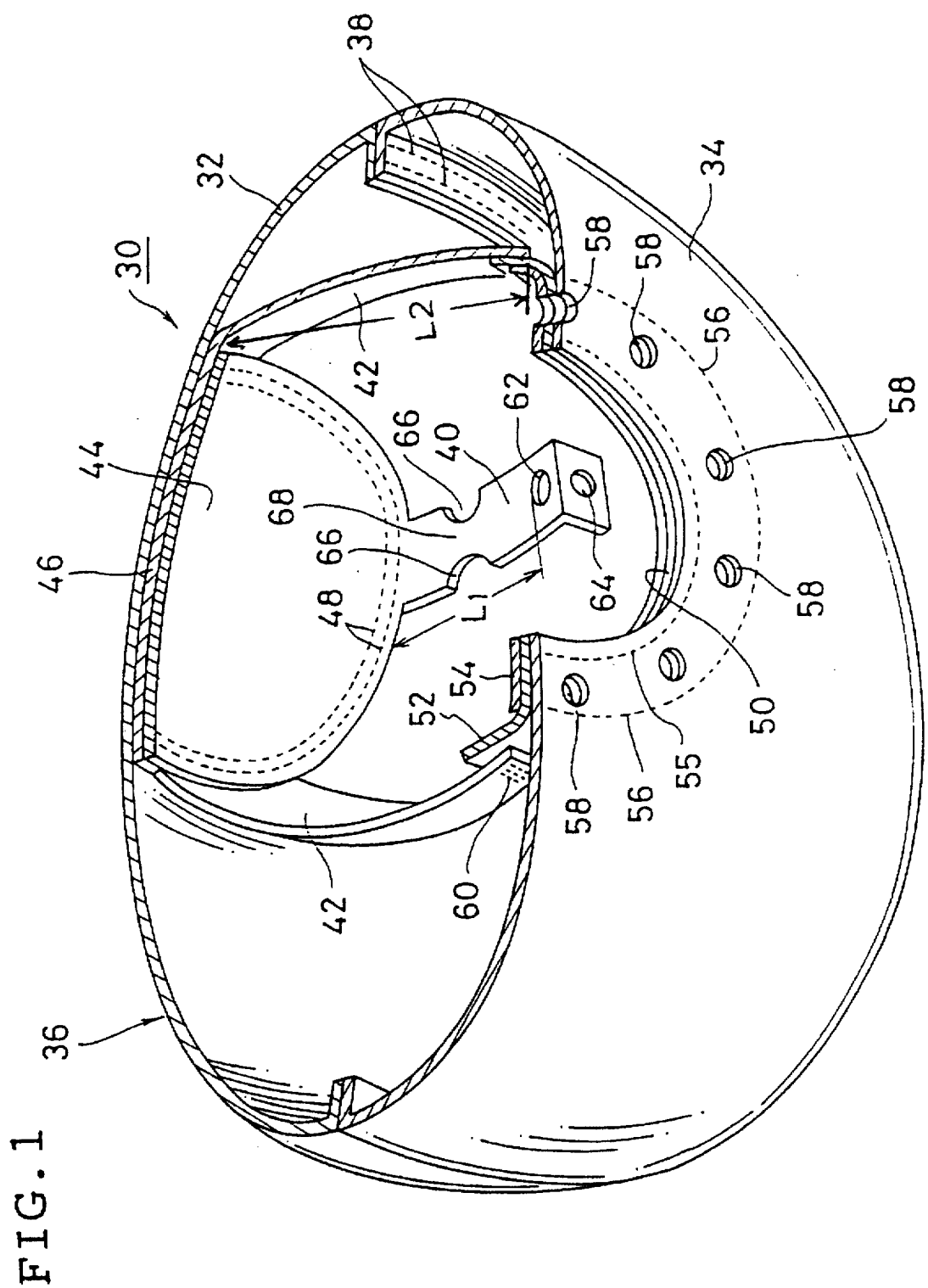
FIG. 1 is a perspective sectional view of an air bag according to an embodiment.

FIG. 1 is a perspective sectional view of an air bag 30 according to the embodiment.

The air bag 30 comprises a main body 36 formed by sewing up the respective peripheries of two fabrics, a front panel 32 and a rear panel 34 with a thread 38, first tether belts 40 and second tether belts 42 for connecting the central portion of the front panel 32 and the central portion of the rear panel 34 together.

The front panel 32 has two reinforcing fabrics 44, 46 sewn on the central portion thereof with a thread 48. The first tether belts 40 are integrated with the reinforcing fabric 44. The second tether belts 42 are integrated with the reinforcing fabric 46. It should be understood that one of the first tether belts 40 and one of the second tether belts 42 may be integrated with the reinforcing fabric 44 and the others may be integrated with the reinforcing fabric 46.

The rear panel 34 has an inflator receiving opening 50 formed in the central portion thereof, and annular reinforcing fabrics 52, 54 sewn on the periphery of the opening 50 with threads 55, 56. The reinforcing fabrics 52, 54 and the rear panel 34 have a plurality of through holes 58, respectively, through which mounting members are inserted. The through holes 58 are formed around the periphery of the opening 50 at intervals.

The ends of the second tether belts 42 are sewn on the reinforcing fabric 52 with a thread 60.

The ends of the first tether belts 40 are sewn on neither the rear panel 34 nor the front panel 32 so as to be free. The free end sides of first tether belts 40 are each provided with two through holes 62, 64 which are positioned to completely face each other when the end of the tether belt 40 is folded along a line therebetween. The length $L_1$ between the front end and the edge of the front end side through hole 62 of each tether belt 40 is 150 mm or less, preferably 120 mm or less, more preferably 100 mm or less. The minimum length $L_1$ may be 0, but normally 5 mm or more, or preferably 10 mm or more.

The first tether belts 40 are each provided with notches 66 on the both sides to form a low strength portion 68. Though the semi-circular notches 66 are shown in this drawing, the notches 66 may be formed in V shape or other shape. The low strength portion 68 may be formed by forming a hole or slit instead of the notches. Furthermore, the low strength portion may be formed by using fabric having low strength at the corresponding portion of the first tether belt 40.

The length $L_2$ of each second tether belt 42 is 50 mm or more longer than the length $L_1$, preferably 100 mm or more, more preferably 200 mm or more longer than the length $L_1$. Though the length $L_2$ differs according to the type of a vehicle in which the air bag device is mounted, normally the length $L_2$ is 160 mm or more, preferably 180 mm or more, more preferably 200 mm or more. In this embodiment, the length $L_2$ of the second tether belt 42 is shown as exactly the length $L_2$ of the second tether belt 42 itself since the width of the reinforcing fabric 52 (the length in the radial direction of the opening 50) is small. However, when the width of the reinforcing fabric 52 is so large that it has an effect on the distance between the central portion of the front panel 32 and the central portion of the rear panel 34 in the fully deployed state, the reinforcing fabric 52 is assumed as a part of the second tether belt so that the sum of the length of the second tether belt 42 plus the length between the threads 56 and 60 is assumed to be the length $L_2$.

Figure 2:
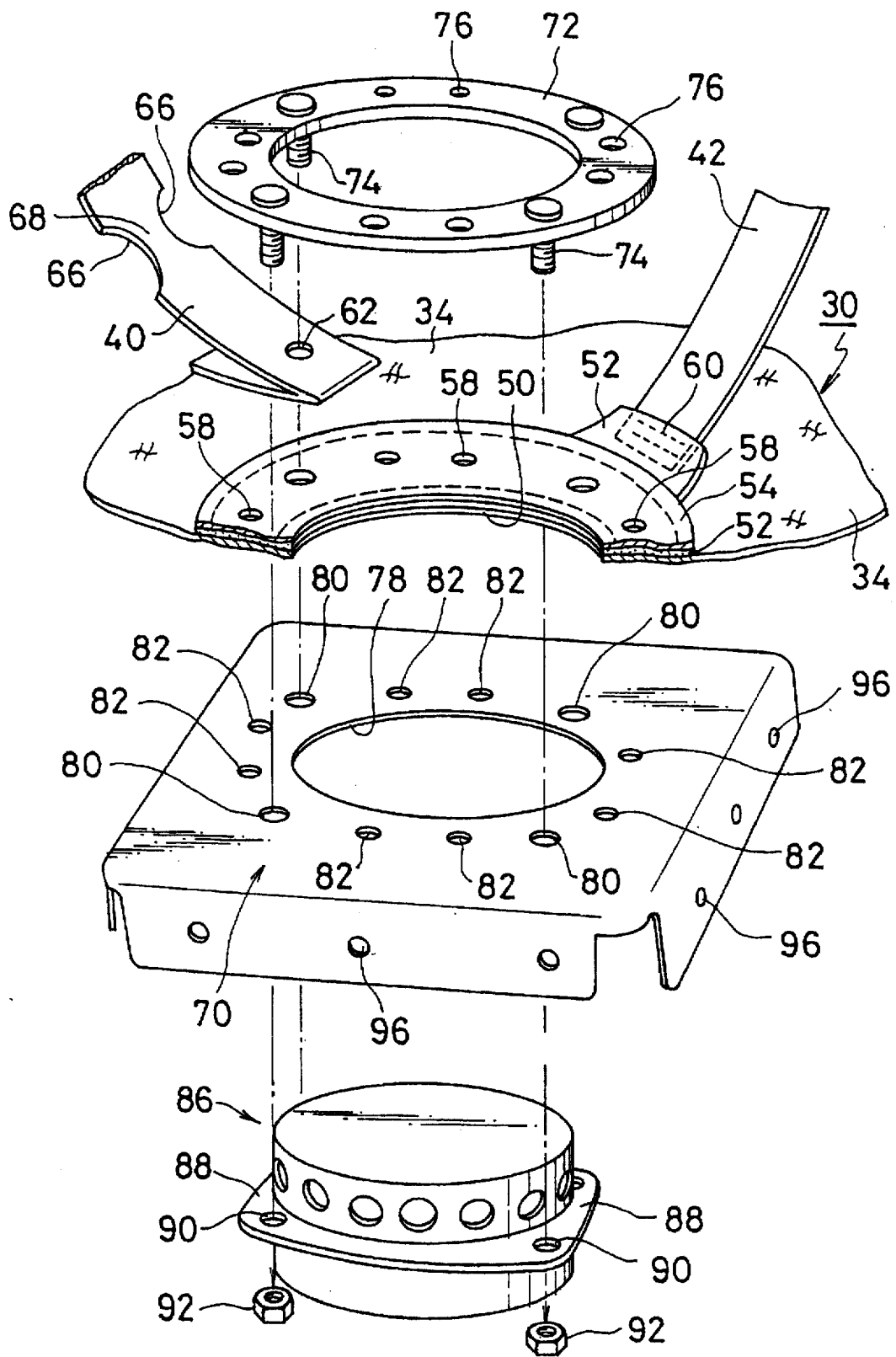
FIG. 2 is an exploded perspective view showing a mounting structure of the air bag to a retainer according to the embodiment.
Figure 3:
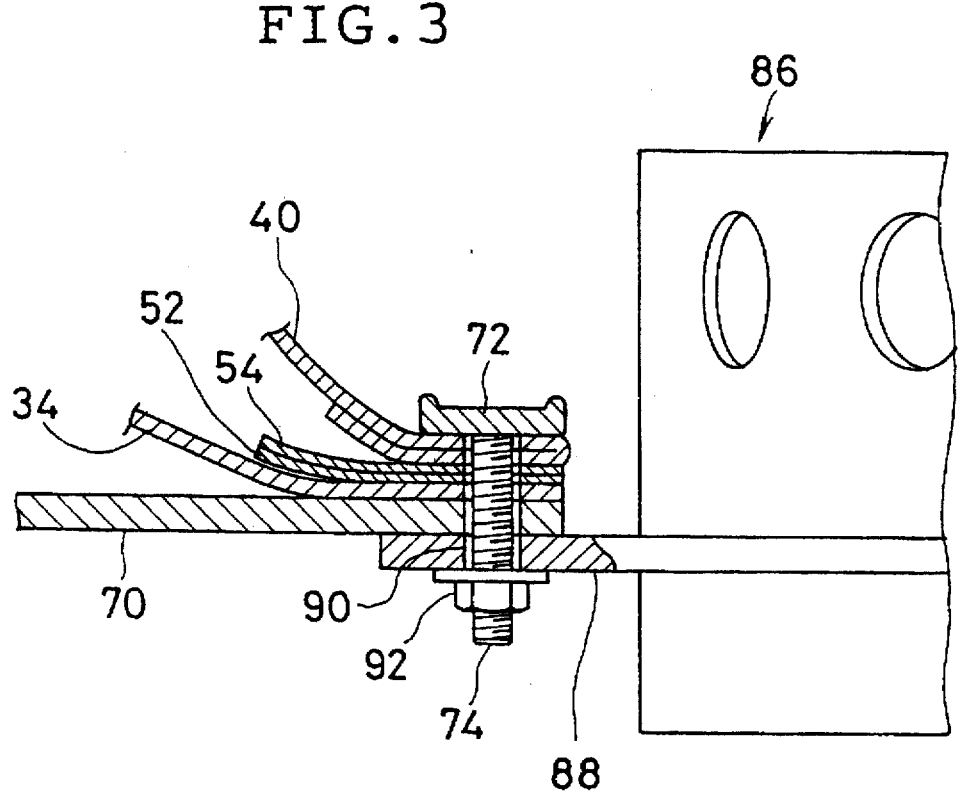
FIG. 3 is a sectional view showing a main part of the mounting structure of the air bag to the retainer according to the embodiment.
Figure 4:
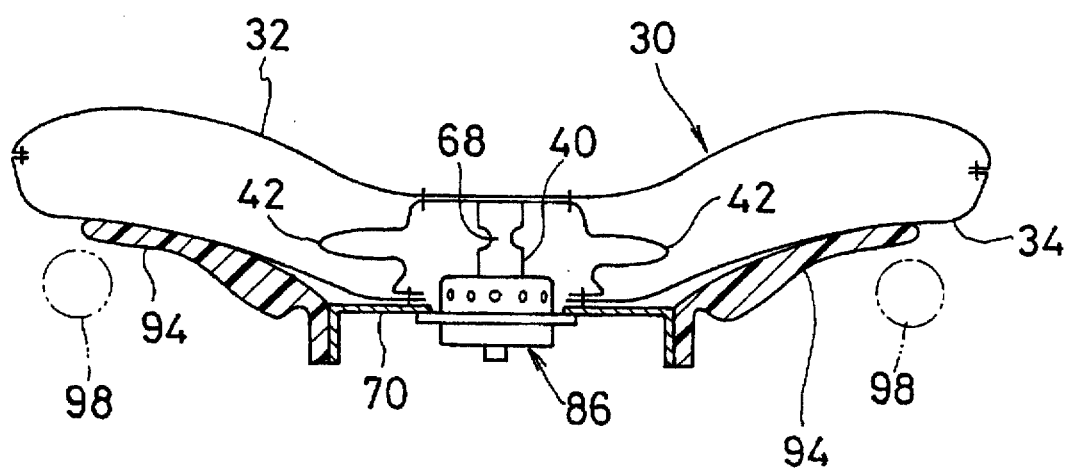
FIG. 4 is a sectional view showing the initial deployment state of an air bag device with the air bag according to the embodiment.
Figure 5:
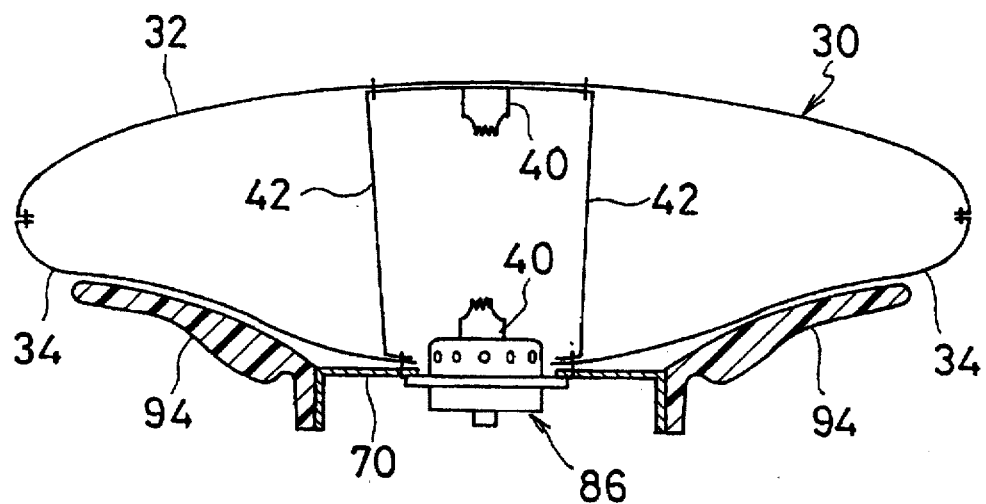
FIG. 5 is a sectional view showing the final deployment state of the air bag device with the air bag according to the embodiment.

FIG. 2 is an exploded perspective view showing a mounting structure of the air bag according to the embodiment of the present invention and shows a state in which the air bag 30 is mounted to a retainer 70 by a ring (ferrule) 72. FIG. 3 is a sectional view showing a mounting structure of the rear end of the first tether belt. FIG. 4 and FIG. 5 are sectional views each showing the operation of the air bag device.

In this embodiment, the ferrule 72 is provided with stud bolts 74. The ferrule 72 has rivet holes 76 therein.

The retainer 70 is provided with bolt holes 80 through which the stud bolts 74 are inserted and rivet holes 82 formed in the periphery of the inflator mounting opening 78.

The inflator 86 has a flange 88 to be laid on the periphery of the inflator mounting opening 78. The flange 88 is provided with bolt holes 90 through which the stud bolts 74 are inserted.

The air bag 30 is disposed on the retainer 70 so that the inflator receiving opening 50 is positioned to be concentric with the inflator mounting opening 78 of the retainer 70. Further, the ferrule 72 is disposed on the periphery of the receiving opening 50 to be concentric with each other. At this time, the stud bolts 74 am inserted into the through holes 62, 64 of the first tether belts 40, the through holes 58 of the air bag 30, the bolt holes 80 of the retainer 70, and the bolt holes 90 of the flange 88. After that, blind rivets (not shown) are inserted through the holes 82, 58, and 76 and then riveted to fix the ferrule 72 to the retainer 70, thereby clamping the edge of the opening of the air bag 30 between the ferrule 72 and the retainer 70.

Before or after riveting, the stud bolts 74 receive nuts 92 to mount the inflator 86 to the retainer 70, thereby again clamping the edge of the opening 50 of the air bag 30 between the ferrule 72 and the retainer 70.

It should be noted that the riveting can be omitted, or the ferrule 72 may have pins therein and the pins may be inserted into the holes 58, 82.

After mounting the air bag 30 and the inflator 86 to the retainer 70 as mentioned above, the air bag 30 is folded and covered by a module cover 94 (FIGS. 4 and 5) and the module cover 94 is fixed to the retainer 70, thereby completing the air bag device. It should be noted that the retainer 70 of FIG. 2 is provided with holes 96 through which blind rivets are inserted for mounting the module cover 94.

When the inflator 86 of the thus structured air bag device actuates, the module cover 94 is torn and the air bag 30 deploys. In the initial stage of the deployment, the first tether belts 40 connect the front panel 32 and the rear panel 34 so that the air bag 30 can deploy to the outside of the steering wheel 98 rapidly as shown in FIG. 4. Then, the gas pressure in the air bag 30 increases and thus the front panel 32 is pressed forward strongly. Therefore, the low strength portions 68 of the first tether belts 40 are broken because the low strength portions 68 are applied with tensile force exceeding the predetermined value. As a result of this, the front panel 32 deploys forward until the second tether belts 42 are tightly stretched so that the air bag becomes in the fully deployed state as shown in FIG. 5.

As mentioned above, in this air bag device, the central portion of the front panel 32 is positioned quite near the central portion of the rear panel 34 in the initial stage of the deployment, thereby applying substantially all of spouted gas from the inflator 86 to inflate the air bag in the side directions. Therefore, the air bag deploys in the side directions at a quite high speed, with the result that the air bag 30 deploys quite enough between the whole steering wheel and the occupant.

Therefore, though the front panel 32 deploys forward upon tearing the first tether belts 40, the front panel 32 does not come excessively close to the occupant because the front panel 32 is stopped from forward deployment at a position where the second tether belts 42 are tightly stretched.

In the air bag 30, only the front ends of the first tether belts 40 are sewn on the front panel 32 and the rear ends thereof are sewn on neither the front panel 32 nor the rear panel 34. The rear ends are supported to the retainer 70 by inserting the bolts 74 into the holes 62, 64, thereby economizing the steps of sewing the tether belts for manufacturing the air bag 30. Accordingly, this facilitates the manufacture of the air bag.

Figure 6:
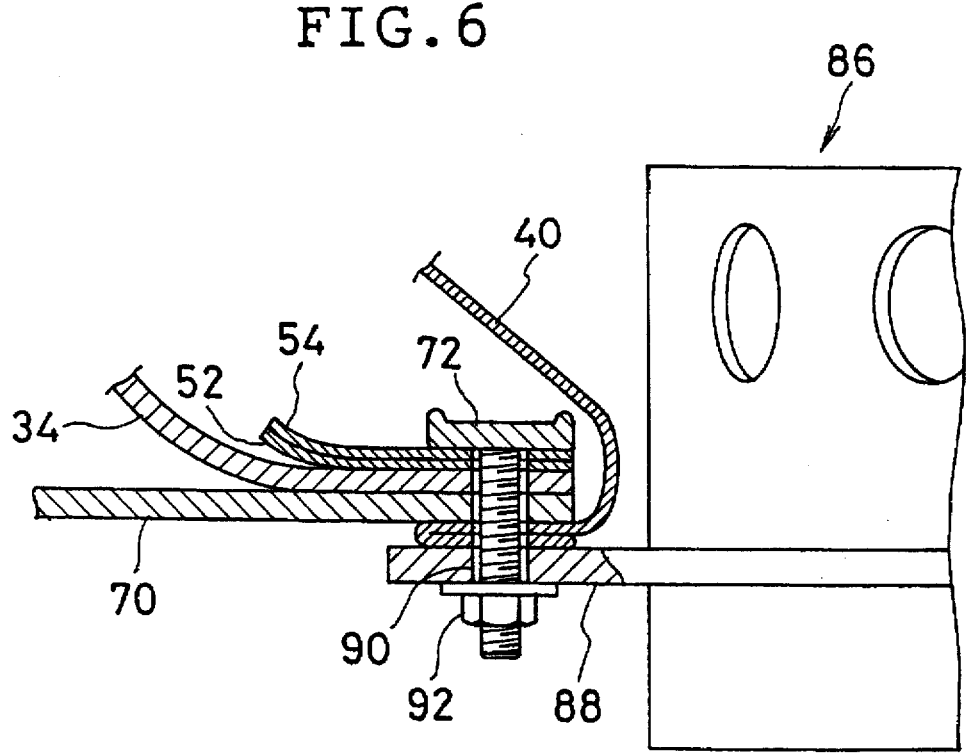
FIG. 6 is a sectional view showing a mounting structure of the air bag according to another embodiment.
Figure 7:
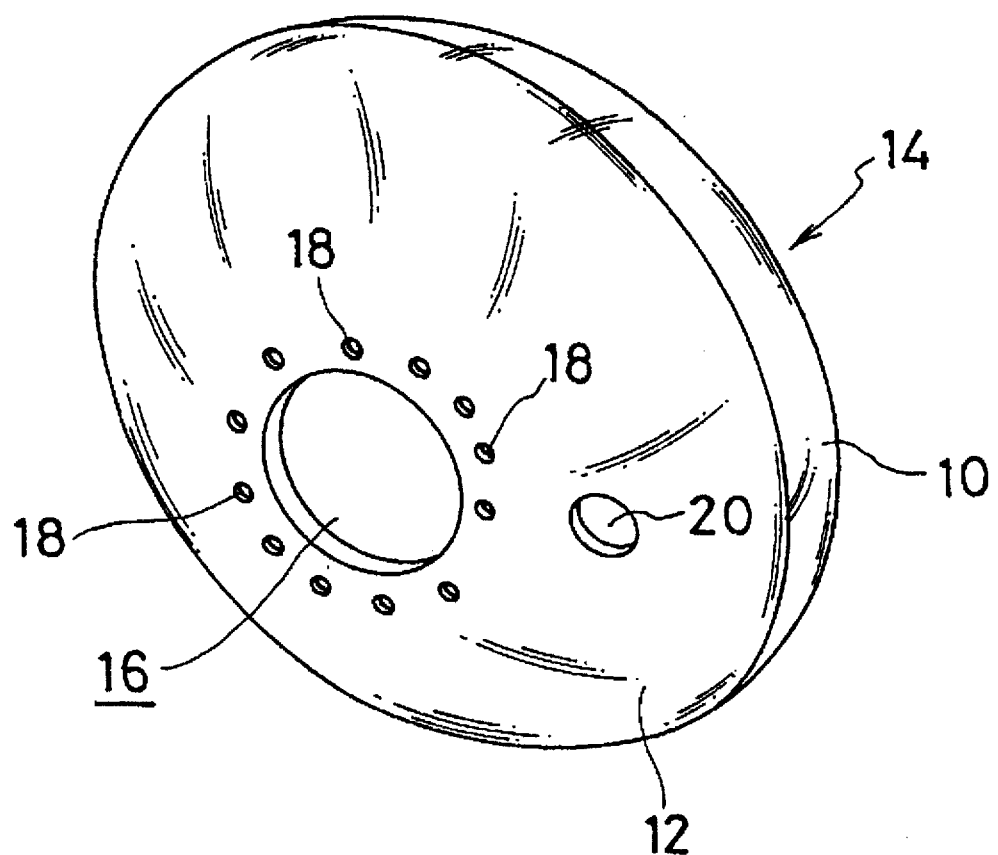
FIG. 7 is a perspective view of a conventional air bag.
Figure 8:
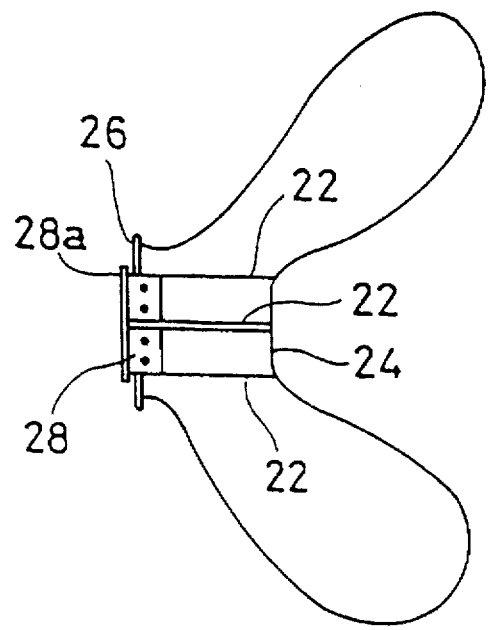
FIG. 8 is a sectional view of a conventional air bag in its halfway deployed state.
Figure 9:
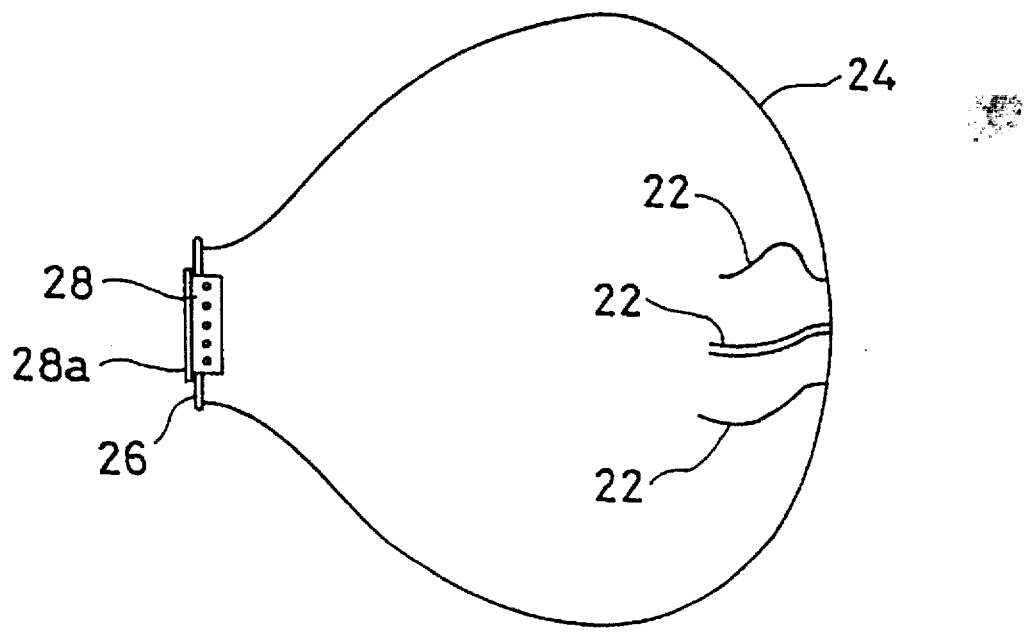
FIG. 9 is a sectional view of the conventional air bag in its fully deployed state.

In the present invention, though the bolts 74 may be inserted through the holes 58 of the rear panel 34 after being inserted through the holes 62, 64 of the tether belts 40 as shown in FIG. 3, it is preferable in view of the assembly that the rear ends of the first tether belts 40 are disposed under the retainer 70 as shown in FIG. 6.

Though the number of the first tether belts 40 and the number of the second tether belts 42 are two each in the above embodiments, one or more of each is enough.

According to the air bag and the mounting structure for the air bag of the present invention, the air bag can deploy to the outside of the steering wheel quite rapidly in the initial stage of the deployment and the front panel can extend suitably forward in the latter stage of the deployment. Therefore, the air bag can protect the occupant quite effectively.

The air bag of the present invention is economized in the steps of sewing the first tether belts, thereby facilitating the manufacture of the air bag.

What we claim is:

1. An air bag adapted to be mounted on a steering wheel by means of mounting members and a retainer, comprising:

a main body made of fabrics and formed of a front panel and a rear panel connected together at peripheries thereof by sewing, an inflator receiving opening formed in said rear panel, through holes formed around said inflator receiving opening of said main body, through which said mounting members are adapted to be inserted for connecting the air bag to the retainer attached to the steering wheel, at least one first tether belt made of fabrics and having a first end and a second end, said first end being connected to said front panel by sewing, and the second end being not sewn to said front panel and said rear panel and having at least one through hole through which one of said mounting members is adapted to be inserted, the length ($L_1$) from said through hole to a connected portion to said front panel being at most 150 mm, a low strength portion formed in said first tether belt for allowing said first tether belt to be torn after at least a part of said main body is adapted to deploy to an outside of the steering wheel, and at least one second tether belt made of fabrics and having a third end and a fourth end, said third end being connected to said front panel by sewing, and the fourth end being connected to said rear panel by sewing, the length ($L_2$) between connected portions to said front and rear panels being at least 50 mm longer than the length ($L_1$), said second tether belt having a strength not to be torn and to connect the front panel and rear panel even after said main body is fully deployed.

2. An air bag as claimed in claim 1, wherein the length ($L_1$) of said first tether belt is at most 100 mm, and the length ($L_2$) of said second tether belt is at least 50 mm longer than the length ($L_1$).

3. An air bag as claimed in claim 1, said second end of the first tether belt has a plurality of said through holes spaced apart from each other in the longitudinal direction of said first tether belt, and the length ($L_1$) is the length between the through hole nearest to the connected portion to the front panel and said connected portion.

4. An air bag mounting structure for a steering wheel comprising:

an air bag including;

a main body made of fabrics and formed of a front panel and a rear panel connected together at peripheries thereof by sewing, an inflator receiving opening formed in said rear panel, through holes formed around said inflator receiving opening of said main body, at least one first tether belt made of fabrics and having a first end and a second end, said first end being connected to said front panel by sewing, and said second end being not sewn to the front and rear panels and having at least one through hole, the length ($L_1$) from said through hole to a connected portion to said front panel being at most 150 mm, a low strength portion formed in said first tether belt for allowing said first tether belt to be torn after at least a part of said main body is adapted to deploy to an outside of the steering wheel, and at least one second tether belt made of fabrics and having a third end and a fourth end, said third end being connected to said front panel by sewing, and the fourth end being connected to said rear panel by sewing, the length ($L_2$) between connected portions to said front and rear panels being at least 50 mm longer than the length ($L_1$), said second tether belt having a strength not to be torn and to connect the front panel and rear panel even after said main body is fully deployed;

a retainer having an inflator mounting opening and mounting member receiving holes disposed around a periphery of said inflator mounting opening, said retainer being adapted to be attached to the steering wheel;

a ring disposed inside said air bag and having mounting members protruding from said ring, said mounting members being inserted into the respective through holes of said air bag and said retainer and said at least one through hole of said first tether belt so that a peripheral portion of said inflator receiving opening of said air bag is clamped between the ring and the retainer and the first tether belt is connect to the retainer.

* * * * *